United States Patent [19]

Sumiyoshi

[11] Patent Number: 4,587,016
[45] Date of Patent: May 6, 1986

[54] CERAMIC FILTER TUBES

[75] Inventor: Ikuo Sumiyoshi, Kashiwa, Japan

[73] Assignee: Shiki Roll Kabushiki Kaisha, Tokyo, Japan

[21] Appl. No.: 620,422

[22] Filed: Jun. 14, 1984

[30] Foreign Application Priority Data

Oct. 17, 1983 [JP] Japan .......................... 58-159338[U]

[51] Int. Cl.$^4$ .......................................... B01D 25/02
[52] U.S. Cl. .................... 210/323.2; 210/347; 210/452; 210/453; 210/486; 210/510.1
[58] Field of Search ................. 210/323.1, 323.2, 330, 210/331, 346, 347, 433.1, 442, 452, 445, 450, 453, 454, 457, 486, 510.1, 500.2

[56] References Cited

U.S. PATENT DOCUMENTS

| | | | |
|---|---|---|---|
| 2,016,161 | 10/1935 | Wilderman | 210/510.1 |
| 2,726,770 | 12/1955 | Sette | 210/510.1 |
| 2,801,751 | 8/1957 | Thomas | 210/510.1 |
| 3,291,310 | 12/1966 | Marvel | 210/510.1 |
| 3,441,143 | 4/1969 | Kudlaty | 210/510.1 |
| 3,747,765 | 7/1973 | Nowak | 210/510.1 |
| 3,862,030 | 1/1975 | Goldberg | 210/500.2 |
| 4,072,616 | 2/1978 | Röhlig | 210/510.1 |
| 4,196,027 | 4/1980 | Walker et al. | 210/510.1 |
| 4,251,377 | 2/1981 | Schleinitz | 210/510.1 |
| 4,258,099 | 3/1981 | Narumiya | 210/510.1 |
| 4,336,043 | 6/1982 | Aonuma et al. | 210/323.2 |
| 4,381,998 | 5/1983 | Roberts et al. | 210/510.1 |

FOREIGN PATENT DOCUMENTS 119413 9/1980 Japan .
119414 9/1980 Japan .
137021 10/1980 Japan .

Primary Examiner—Richard V. Fisher
Assistant Examiner—Wanda L. Millard
Attorney, Agent, or Firm—Gordon W. Hueschen

[57] ABSTRACT

A filter, comprising in combination with a cartridge type filter element incorporating at least one cylindrical porous ceramic unit having a controlled pore diameter and a fixed wall thickness, opening at both ends and obtained by the steps of blending an aggregate of uniform, finely divided polyhedral particles of at least one kind of artificial raw material with an inorganic binder and an organic plasticizer, extrusion molding the resultant blend into a tube, and calcining the molded tube, which cylindrical porous ceramic unit is watertightly closed at one-end part thereof with an end plate and watertightly supported in place at the other-end part thereof with a bundling ring while the filtrate discharge duct defined by said cylindrical porous ceramic unit is allowed to form a filtrate discharge path; a case encircling said filter element; and a cover provided with a filtrate discharge path communicating with the empty space intervening between said case and said filter element, and adapted to seal tightly the upper end of said case.

9 Claims, 3 Drawing Figures

CERAMIC FILTER TUBES

BACKGROUND OF THE INVENTION

1. Field of the Invention

This invention relates to a filter. More particularly, this invention relates to a cartridge type clarifying filter.

2. Description of Prior Arts

The clarifying filter is a device for collecting solid particles suspended in a dilute slurry and, as such, finds utility in a wide variety of applications such as for filtration of water or drinking water, for filtration of products in the pharmaceutical industry, for filtration of fuel and lubricant oils, for filtation of electroplating liquid, and for recovery of solvents.

The performance of this filter hinges heavily on the quality and composition of the filter medium used therein. For example, woven fabric, filter paper, felt, non-woven fabric, paper pulp and fibrous materials coated with finely powdered inorganic substances which are most popularly used as filter media are inexpensive but lack the strength required in withstanding the pressure of filtration or the mechanical wear. Further, most of them lack the stability required in resistance to acids and alkalis and have no sufficient ability to resist to heat. Generally then are discarded after short periods of service because of the phenomenon of clogging. Thus, they are not economical.

Plastic membranes containing fine pores uniform in diameter are convenient filter media in the sense that they are easy of production. Similarly to those fibrous materials mentioned above, however, they have a disadvantage that their stability to resist to chemicals and heat is not sufficient. For the purpose of elminating this drawback, filter media using fluorine resins such as a tetrafluoroethylene resin (Teflon by trademark designation), for example, have been developed. These new filter media still suffer from a disadvantage that they are not readily wetted with water and, therefore, offer much resistance to passing water and, what is more, they are expensive.

Recently, sintered metals also have come to be used as filter media. Such sintered metals, however, cannot be expected to provide the phenomenon of interstitial crosslinking of those solid particles desired to be separated from the dilute slurry under treatment becuase their crystal particles have a spheric shape. They are, consequently, required to retain their pores in a particularly small diameter. As filters, they offer great resistance to passing water and suffer from heavy clogging.

Porous ceramic articles such as, for example, calcined articles of diatomaceous material are also in use as filter media. Although these ceramic articles predominantly use natural raw materials and incorporate various additives suitably, their sintering is based on the self-sintering of porous particulate raw materials. The desired control of pore diameter, therefore, is difficult. The porous ceramic articles possess no sufficient strength because their backbone particles are porous by nature, because the diatomaceous earth as the main raw material which is a mineral produce of nature has its $SiO_2$ content, alkali metal oxides content and alkaline earth metal oxides content in variable proportions and yields an inconsistent effect upon the produced ceramic, and further because any porous article obtained by the self-sintering process has its own limit to the extent to which the wetting property is enhanced by mutual contact.

In the circumstance, the desirability of developing a filter medium which enjoys high durability, excels in stability to resist heat and chemicals, offers only low resistance to passing water, and possesses an ability to provide thorough collection of solid particles desired to be separated from a given dilute slurry has been finding growing recognition.

Then, for the purpose of providing a filter with a wide area of filtration, there may be conceived an idea of designing a filter element incorporating therein a multiplicity of filter leaves (or cylindrical filter units). When fibrous materials or plastic membranes are used as filter leaves, for example, they inevitably require use of suitable supporting means. When the filter leaves are formed of ceramic material, they mever permit ample reduction in size because of their limited strength.

In is, therefore, an object of this invention to provide a novel filter.

Another object of this invention is to provide a filter which enjoys high durability, excels in stability to resist heat and chemicals, offers only low resistance to passing water, possesees an ability to provide thorough collection of solid particles desired to be separated from a given dilute slurry, and enables its filter units to be easily backwashed and replaced.

SUMMARY OF THE INVENTION

These objects described above are accomplished by a filter which comprises a cartridge type filter element incorporating at least one cylindrical porous ceramic unit having a controlled pore diameter and a fixed wall thickness, opening at both ends and obtained by the steps of blending an aggregate of uniform, finely divided polyhedral particles of at least one kind of artificial raw material with an inorganic binder and an organic plasticizer, extrusion molding the resultant blend into tubes, and calcining the molded tubes, which cylindrical porous ceramic unit is watertightly closed at one-end parts thereof with an end plate and watertightly supported in place at the other-end parts thereof with a bundling ring while the filtrate discharge ducts defined by the cylindrical porous ceramic units are allowed to join at the latter end parts to form a filtrate discharge path; a case encircling the aforementioned filter element; and a cover proided with a filtrate discharge path communicating with the filtrate discharge path of the aforementioned filter element, further provided with a feed liquid injection path communicating with the empty space intervening between the aforementioned case and the aforementioned filter element, and adapted to seal tightly the upper end of the aforementioned case.

PREFERRED EMBODIMENT OF THE INVENTION

Now, the present invention will be described in detail below with reference to the accompanying drawings.

Figure 1:
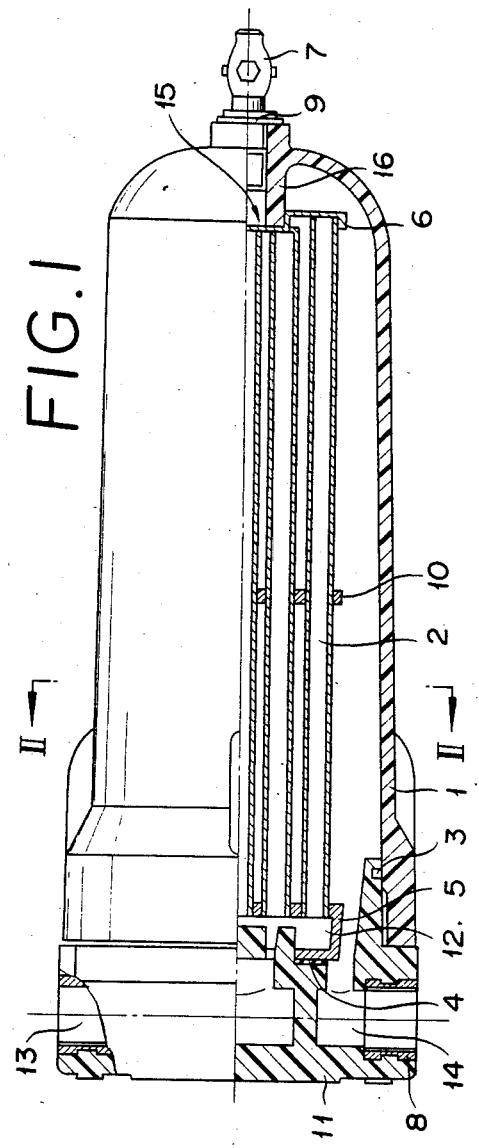
FIG. 1 is a half-cutaway view of one embodiment of the filter according to this invention.
Figure 3:
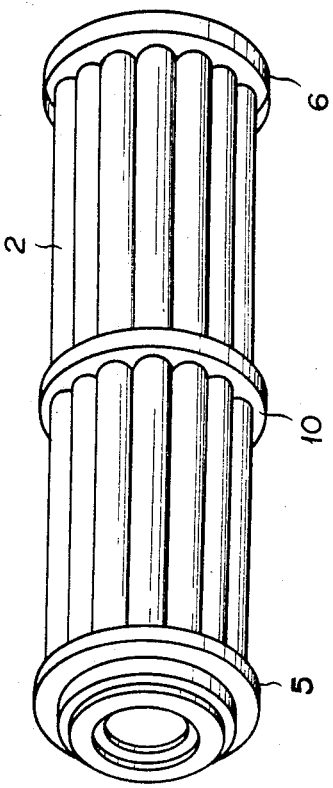
FIG. 3 is a perspective view of a cartridge type filter element part in the embodiment of FIG. 1.
Figure 2:
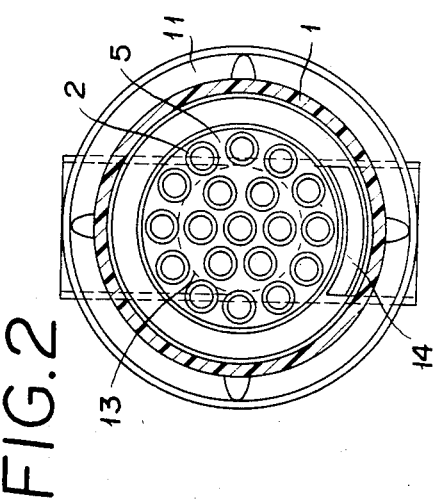
FIG. 2 is a cross section taken along the line II—II of the diagram of FIG. 1.

FIG. 1 is a half-cutaway view of one embodiment of the filter according to the present invention. The filter of the present embodiment comprises a cartridge type filter element having a plurality of cylindrical filter units 2 watertightly closed at the one end parts thereof with an end plate 6 and watertightly supported in place at the other end parts thereof with a bundling ring 5 while allowing filtrate discharge ducts defined by the filter units 2 to be joined at the latter end parts to form a filtrate discharge path 12, a case 1 encircling the aforementioned filter element, and a cover 11 provided with a filter discharge path 13 communicating with the filtrate discharge path 12 of the aforementioned filter element, further provided with a feed liquid injection path 14 communicating with the empty space intervening between the case 1 and the aforementioned filter element, and adapted to seal tightly the upper end of the aforementioned case.

The cylindrical filter units 2 are porous ceramic tubes having a controlled pore diameter and a fixed wall thickness, opening at both ends, and produced by the steps of blending an aggregate of uniform, finely divided polyhedral particles of at least one kind of artificial raw material with an inorganic binder and an organic plasticizer, extrusion molding the resultant blend into tubes, and calcining the molded tubes. Although, in the present embodiment, the filter units are described as having a cylindrical shape, they may be in any desired columnar shape so far as they are capable of defining a filtrate discharge duct.

Examples of the synthetic raw material for the aforementioned aggregate include alumina, mullite, silicon carbide and silica. Such a synthetic raw material is invariably pulverized mechanically and then classified as by levigation, to permit selective collection of only finely divided particles uniform in diameter. The reason for this uniform diameter is that the pores formed in the calcined molded tubes are required to have diameters distributed in a narrow range. The particles of the aggregate are desired to have a polyhedral shape because the particles of that shape, after the step of calcining, give rise to desirable constricted cavities therein and consequently induce the phenomenon of crosslinking of solid particles desired to be separated from a given dilute slurry.

Examples of the inorganic binder usable advantageously herein include clay, soda lime and glass cullet. The inorganic binder may suitably incorporate therein a carbonate and/or a borate as a calcination accelerator. In is desired to have as small a particle diameter as possible.

Examples of the organic plasticizer usable advantageously herein include gum arabic, starch, wax and carboxymethyl cellulose, such vinyl resins as polyvinyl chloride, polyvinylidene chloride, polyvinyl alcohol and polyvinyl acetal, such acrylic acid resins as acrylic ester polymers, and other similar thermoplastic resins. Among other organic plasticizers, thermoplastic synthetic resins, particularly polyvinyl alcohols, which are capable of imparting ample plasticity even in a small application rate prove desirable. The organic plasticizer serves to improve the porosity of the calcined molded tubes in addition to imparting plasticity to the aggregate.

The molding of the blend in the shape of tubes is desired to be performed by the extrusion molding technique. The choice of this particular technique is because this technique enables tubes of a fixed cross section to be obtained in any desired length. The molded tubes are dried at a temperature in the range of normal room temperature to about 80° C. and then calcined.

The calcination temperature is suitably selected in the range of about 900° to about 1,300° C., depending on the kind and the particle diameter of aggregate, etc. Since the blend to be calcined in the present embodiment incorporates an inorganic binder, the sintering can be controlled easily as compared with the self-sintering. The calcination, consequently, produces a porous ceramic having uniform porosity.

In the porous ceramic tubes of a controlled pore diameter obtained by calcination as described above, no organic substance other than the aggregate is suffered to survive and exert adverse effects because, as the plasticizer, an organic substance having a low ash content is used instead of inorganic clay and the binder alone is used as an inorganic substance, and that in an irreducibly minimum amount.

The end plate 6 serves to close the openings of the filter units 2 at one-end parts thereof and, at the same time, keep the filter units 2 bound together. It amply fulfills its function by being capable of closing the filter units 2 at the one-end parts. Thus, it is not limited to the shape of a plate. This end plate 6 is provided at the center thereof with a depression 15. The bundling ring 5 is provided in one-end surface thereof with holes to be fitted in by the filter units 2. By fitting the other ends of the filter units 2 into these holes and fusing the joints, there is formed a filtrate discharge path which communicates with the interiors of these filter units 2. Where there are used two or more filter units 2, this bundling ring 5 concurrently serves as a spacer for keeping the filter units separated from one another. The bundling ring 5 is further provided, where it joins the cover 11, with a packing of natural rubber or such synthetic rubber as SBR, NBR or urethane rubber, to ensure tight union with the cover.

The union of the filter units 2 with the end plate 6 or with the bundling ring 5 is effected by adhesive means which excels in resistance to heat, chemicals and pressure and provides an advantageous sealing effect.

Where there are used two or more filter units 2 the cartridge type filter element is optionally provided with a support ring 10, for example, for the purpose of keeping the filter units separated from one another.

The case 1 is joined to the cover through the medium of an O-ring 3. When this case 1 is made of a transparent substance, it permits ready observation of the operation of filtration taking place in its interior and thus warrants early detection of occurrence of adverse phenomena such as deposition of filter cake. This case 1 is closed at one end as illustrated in FIG. 1. This closed end has a projection 16 formed at the center on the inner side thereof. This projection 16 is held in contact with the depression 15 on the end plate 6. This contact between the projection 16 and the depression 15 is tightened to immobilize the filter element 2 in place when the cover 11 is helically fastened to the case 1. Further, the case 1 is desired to be provided near the lower end thereof, particularly in the projection, with a petcock 7 for draining condensate.

The filter of this invention is used in a wide variety of applications such as, for example, filtration of water or drinking water, filtration of chemicals in the pharmaceutical industry, filtration of fuel or lubricant oil, filtration of electroplating liquid, recovery of solvents and filtration of gases or air. It proves particularly advantageous for solid-separation. Since the pores formed in the filter units of the filter of this invention can have their diameter controlled by the diameter of the particles making up the aggregate as the raw material, incorporation of those filter units obtained by using an aggregate of particularly fine particles enables the filter of this invention to be advantageously used for the removal of microorganic cells, for example.

This invention is not limited to the embodiment just described. It admits of various applications indicated below by way of illustration.

First, the case of the filter of this invention serves as a reservoir for the feed liquid to be treated. The empty space of this case may be filled with such an adsorbent as activated carbon or ion-exchange resin or with a porous material such as porous glass or porous ceramic for the purpose of enhancing the effect of filtration.

Then, the filter of this invention may incorporate therein a plurality of cartridge type filter elements in a connected form. In this case, the end plate of each of the cartridge type filter elements is naturally required to be provided with a hole for communication with the filtrate discharge path of the preceding cartridge type filter element.

The filter of this invention is enabled to improve its own performance with an added function by providing the cartridge type filter element with a varying coating.

When the filter is to be used for the removal of microorganic cells by filtration, for example, it is enabled to acquire a fungicidal ability by causing such a fungicidally active metal ion as copper ion or silver ion to be adsorbed on the cylindrical filter units and the support ring. This adsorption of copper or silver ion may be effectively accomplished by the use of any of the known methods such as, for example, the method which causes direct adsorption of a sulfate or nitrate of copper or silver in its unaltered form, the method which comprises first causing adsorption of a tin compound and subsequently causing adsorption of copper or silver ion through a substitutive reaction effected by immersion in a sulfate or nitrate of copper or silver, and the method which resorts to a silver mirror reaction.

When the filter of this invention is to be used for the filtration of a gas or air, it is enabled to acquire an added ability to remove moisture from the gas by coating the cylindrical filter units with a water-repellent substance such as silicone resin. The coating with silicone resin, for example, is accomplished by any of the known methods such as the method which uses a silane monomer, the method which uses silicone oil, and the method which uses silicone varnish. Specifically, the coating is effected by depositing the given coating material on the surface of the cylindrical filter units with the aid of a spray or brush, optionally followed by a heat treatment.

In the field of the chemistry of fermentation, the filter of this invention may be utilized for fermenting the filtrate by embedding a given fermenting yeast in the cylindrical filter units.

Of course, none of the various forms of coating described above is allowed to stop up the pores in the filter units and deprive the filter units of their inherent function.

The filter of the present invention configurated as described above possesses the following outstanding properies.

Firstly, the filter of this invention possesses numerous properies, depending on its filter units. Since the filter units are obtained by having an aggregate of uniform polyhedral particlres sintered through the medium of an inorganic binder, they possess uniform, ideally constricted pores and, therefore, provide through collection of solid particles desired to be separated from a given dilute slurry. Since the filter units are produced by using an artificial raw material as the aggregate and sintering this aggregate through the medium of an inorganic binder and further since the aggregate has high strength and high sintering strength, the produced filter units excel in physical strength. The high physical strength permits a reduction in the wall thickness of the filter units and consequently promises a decrease in the resistance offered by the filter units to passing water and in the dimensions of the filter units. Further, the filter units excel in resistance to heat and chemicals because they use as the aggregate and artificial raw material enjoying high resistance to heat and chemicals and use the organic binder deficient in resistance to alkalis barely in its irreducibly minimum amount. Moreover, the fact that the filter units obtain improved porosity by using an organic plasticizer contributes much to the descreased resistance to passing water due to the reduced wall thickness.

Secondly, since the filter of the present invention incorporates the cartridge type filter element which has one or more cylindrical filter units of such outstanding properties watertightly closed on the upper-end parts thereof and water-tightly supported in place with the bundling ring at the lower-end parts thereof while having a filtrate discharge path so formed as to communicate with the interiors of the cylindrical filter units, it exhibits a high capacity for filtration. Moreover, the filter element is designed so as to be replaced completely in itself or to be backwashed. Thus, the filter of this invention is free from the troublesome works otherwise entailed with respect to such replacement or backwashing.

Thirdly, since filter of this invention uses its case component as the reservoir for the feed liquid under treatment, it obviates the necessity of being provided with storage means specifically.

Fourthly, since the filter of this invention effects the required filtration of a given liquid by passing this liquid through the cylindrical filter units inwardly from their exteriors, it can compensate for the poor tensile stress suffered by the filter units.

What is claimed is:

1. A filter comprising in combination: a cartridge-type filter element having a plurality of filter units each of which consists of a cylindrical porous ceramic tube having a controlled pore diameter, a fixed wall thickness, and is open at both ends, and a case therefore in which said cylindrical porous ceramic tubes are watertightly closed at one-end part thereof with an end plate and watertightly supported in place at the other end part thereof with a bundling ring which has a filtrate discharge duct in communication with the interior of said tubes to form a filtrate discharge path; in which said case encircles said filter element; in which a cover has outlet means providing a filtrate discharge path communicating with the interior of said tubes through said discharge duct and said bundling ring; in which said cover also has inlet means which provides a feed liquid injection path which communicates with the empty space intervening between said case and said filter element and with the exterior surface of all of said tubes; and in which said cover tightly seals said case, whereby the feed liquid is constrained to flow through said porous ceramic tubes in its traverse from said inlet means to said discharge means, and wherein said tubes are disposed side by side in parallel relation with the ends thereof at one end being watertightly closed by said end plate and the ends thereof at the opposite end opening into and water-tightly sealed in said bundling ring.

2. A filter according to claim 1, wherein each of said tubes is obtained by the steps of blending an aggregate of uniform, finely divided polyhedral particles of at least one kind of artificial raw material with an inorganic binder and an organic plasticizer, extrusion molding the resultant blend into a tube, and calcining the molded tube.

3. A filter according to claim 2, wherein said case is a cylindrical member closed at one end thereof and open at the other end thereof and wherein said open end is closed by said cover.

4. A filter according to claim 3, wherein said case is provided at the inner side of said closed end with a central projection and said end plate is provided at the center thereof with a complementary depression, so that said filter element is centered in said case when said cover is fastened to said case with said projection disposed in depression.

5. A filter according to claim 4, wherein said projection is a hollow cylinder, one end of which seats in said depression and the other end of which is an integral part of said case and communicates with a drain port.

6. A filter according to claim 2, wherein the distances separating said tubes are retained by means of a support ring.

7. A filter according to claim 1, wherein said case is a cylindrical member closed at one end thereof and open at the other end thereof and wherein said open end is closed by said cover.

8. A filter according to claim 1, wherein said case is provided at the inner side of said closed end with a tubular projection and said end plate is provided at the center thereof with a complementary depression, so that said filter element is centered in said case when said cover is fastened to said case with said projection disposed in the said depression.

9. A filter according to claim 1, wherein the distances separating said filter units are retained by means of a support ring.

* * * * *

UNITED STATES PATENT AND TRADEMARK OFFICE
CERTIFICATE OF CORRECTION

PATENT NO. : 4,587,016

DATED : May 6, 1986

INVENTOR(S) : Ikuo Sumiyoshi

It is certified that error appears in the above-identified patent and that said Letters Patent is hereby corrected as shown below:

```
Col. 1, line 15;  "filtation" should read -- filtration --
Col. 1, line 27;  "then" should read -- they --
Col. 1, line 35;  "elminating" should read -- eliminating --
Col. 1, line 47;  "becuase" should read -- because --
Col. 2, line 15;  "mever" should read -- never --
Col. 2, line 22;  "possesees" should read -- possesses --
Col. 2, line 45;  "proided" should read -- provided --
Col. 3, line 1;   "one end" should read -- one-end --
Col. 3, line 3;   "other end" should read -- other-end --
Col. 3, line 47;  "In" should read -- It --
Col. 4, line 40;  after the "2" insert a comma -- , --
Col. 5, line 66;  "particlres" should read -- particles --
Col. 5, line 68;  "through" should read -- thorough --
Col. 6, line 19;  "descreased" should read -- decreased --
Col. 6, line 35;  after "since" insert -- the --
Col. 7, line 22;  before "depression" insert -- said --
```

Signed and Sealed this

Sixteenth Day of September 1986

[SEAL]

Attest:

DONALD J. QUIGG

Attesting Officer

Commissioner of Patents and Trademarks